United States Patent [19]

Miyake

[11] Patent Number: 4,951,128
[45] Date of Patent: Aug. 21, 1990

[54] CORRELATION DETECTING FOR INDICATING THE CORRELATION OF VERTICALLY ALIGNED PIXEL DATA

[75] Inventor: Yoshitaka Miyake, Kanagawa, Japan

[73] Assignee: Sony Corporation, Tokyo, Japan

[21] Appl. No.: 253,563

[22] Filed: Oct. 5, 1988

[30] Foreign Application Priority Data

Oct. 9, 1987 [JP] Japan .................. 62-255561

[51] Int. Cl.$^5$ ............................................. H04N 9/78
[52] U.S. Cl. .......................................... 358/31; 358/40
[58] Field of Search .................... 358/31, 37, 39, 40, 358/21 V, 21 R

[56] References Cited

U.S. PATENT DOCUMENTS

| | | | |
|---|---|---|---|
| 4,178,609 | 12/1979 | Beutel | 358/31 |
| 4,348,689 | 9/1982 | Achiha | 358/40 |
| 4,355,333 | 10/1982 | Sato | 358/37 |
| 4,513,311 | 4/1985 | Hirai | 358/31 |
| 4,570,177 | 2/1986 | Kondo | 358/31 |
| 4,591,911 | 5/1986 | Tanaka | 358/31 |
| 4,703,342 | 10/1987 | Takahashi | 358/31 |
| 4,764,964 | 6/1988 | Tanaka | 358/31 |

Primary Examiner—Tommy P. Chin
Attorney, Agent, or Firm—Alvin Sinderbrand

[57] ABSTRACT

Correlation of a video signal having a chrominance component is detected by combining three successive line intervals of the video signal to produce a first signal by obtaining the sum of the video signals of those three line intervals, combining at least two of those three line intervals to produce a second signal by obtaining the difference between the video signals of such two line intervals; detecting the absolute values of the first and second signals, respectively; and determining the difference between the absolute values of the first and second signals to produce a correlation indication signal.

38 Claims, 4 Drawing Sheets

CORRELATION DETECTING FOR INDICATING THE CORRELATION OF VERTICALLY ALIGNED PIXEL DATA

BACKGROUND OF THE INVENTION

1. Field of the Invention

This invention relates to video signal processing and, more particularly, to a method and apparatus for detecting the correlation of video information in successive line intervals, thereby indicating the correlation of vertically aligned pixel data.

2. Discussion of the Prior Art

One typical operation in video signal processing is the separation of luminance and chrominance signal components from a composite video signal. Since the respective frequency spectra of the luminance and chrominance components are interleaved, such separation, commonly known and referred to herein as Y/C separation, often is carried out by a comb filter. As is known, however, a comb filter can be used successfully if the signal information in successive horizontal line intervals of the video signal is substantially the same. More particularly, if the video signal, or at least the chrominance components therein, exhibit good vertical correlation, the comb filter will function properly to separate the luminance and chrominance components. However, in the absence of good correlation, that is, if there is little equality in the video information from line-to-line, Y/C separation by means of the comb filter will be erroneous. In that case, separation of the luminance and chrominance components is best achieved by using band pass filters.

Since the information content of a video picture varies, the correlation of a video signal representing the video picture likewise varies. Hence, a typical Y/C separator includes both a comb filter and band pass filters. The selection of the comb filter or the band pass filters is a function of the detected correlation of the video signal; and one or the other is switched into the video signal processing channel to effect Y/C separation.

Another application of correlation detection relates to the avoidance of so-called "cross-luminance". Cross-luminance occurs when the frequency range of the luminance component crosses over and extends into the frequency range of the chrominance component. Since the frequency spectra of the luminance and chrominance components are interleaved, such cross-luminance, that is, an intrusion of a frequency band of the luminance component into a frequency band of the chrominance component, will result in interference between the luminance and chrominance signals. Correlation detection is useful in avoiding such interference.

One technique for detecting vertical correlation of the chrominance component in a video signal compares the video information present in every other horizontal line interval. For example, if the instantaneous horizontal line interval is designated the nth line, the preceding line interval is designated the (n−1)th line and the next preceding line interval is designated the (n−2)th line, correlation is detected by comparing the video information, and particularly the chrominance component, of the nth line to that of the (n−2)th line, such as by subtracting one from the other to produce a difference signal. The chrominance component frequencies included in this difference signal are extracted, as by use of a band pass filter having a pass band corresponding to the frequency band of the chrominance component; and the filtered difference signal thus represents the vertical correlation of the chrominance component. Complete correlation is indicated when the filtered difference signal, that is, the output of the band pass filter, is zero. This indicates that the video information and, particularly, the chrominance information, in the compared line intervals is substantially identical. Conversely, the output of the band pass filter exhibits a maximum level when the information in the compared line intervals is quite different. Thus, it is expected that the signal level at the output of the band pass filter varies between zero and a maximum level, depending upon the vertical correlation of the chrominance component.

It is expected that the aforementioned correlation detecting signal, that is, the output of the band pass filter, will vary significantly over a video field or frame. When correlation is used to select a comb filter or a band pass filter for Y-C separation, it is desirable to avoid frequent switching, if possible. This is achieved by establishing a threshold level to which the correlation detection signal is compared. Correlation is assumed to be present when the correlation detection level is below this threshold level, and it is assumed that there is no correlation when the threshold level is exceeded.

In a conventional correlation detection technique, the vertical spatial frequency characteristics of those components in the chrominance frequency band (i.e. in the vicinity of the chrominance subcarrier frequency) varies as a function of the level of the input signal. Accordingly, the output of the band pass filter, which is used as an indication of vertical correlation, fluctuates as the input signal level changes. Consequently, it is difficult to set a proper threshold level for discriminating between correlation and non-correlation. As an example, if the threshold level is set too high, the band pass filter output may not exceed that high threshold level even though correlation is not present because the input signal level may be relatively low, thus causing the band pass filter output to be below the threshold level. Conversely, if the correlation detection threshold level is too low, the sensitivity of this detecting method becomes such that the threshold level normally is exceeded even when there is relatively good correlation in the video signal. That is, the information in vertically aligned pixels may be quite similar, yet the output level of the band pass filter, although quite low, will exceed the threshold level. As a result, the presence of correlation will be erroneously indicated as non-correlation.

Consequently, cross-luminance avoidance might not be fully effective. Although the conventional correlation detecting technique may operate satisfactorily to avoid cross-luminance for video signals representing special image patterns, such as the color bar pattern, such technique does not satisfactorily avoid cross-luminance for more general picture images.

OBJECTS AND SUMMARY OF THE INVENTION

Therefore, it is an object of the present invention to provide a method and apparatus for detecting correlation having relatively high sensitivity, but avoiding erroneous indications of non-correlation when, in fact, correlation is present, and vice versa.

Another object of this invention is to provide a correlation detection technique for use in a video signal processing system.

A further object of this invention is to provide a correlation detection technique which overcomes the aforenoted problems and disadvantages of the prior art.

An additional object of this invention is to provide a technique for detecting correlation in a video signal which avoids the use of a fixed threshold for discriminating between correlation and non-correlation.

Various other objects, advantages and features of the present invention will become readily apparent from the ensuing detailed description, and the novel features will be particularly pointed out in the appended claims.

In accordance with this invention, correlation of a video signal having a chrominance component is detected by combining three successive line intervals of the video signal to produce a first signal by obtaining the sum of the video signals of those line intervals. At least two of the three line intervals are combined to produce a second signal by obtaining the difference between the video signals of those two line intervals. The absolute values of the first and second signals, respectively, are detected; and then the difference between the absolute values of the first and second signals is produced to represent correlation.

In one embodiment of this invention the aforementioned first signal is produced by delaying the video signal by one horizontal line interval to provide a one-line delayed (1H) signal, by delaying the video signal by two horizontal line intervals to provide a two-line delayed (2H) signal, by level adjusting the 1H signal relative to the supplied video signal and the 2H signal, and then summing the video signal, the level adjusted 1H signal and the 2H signal. The aforementioned second signal is produced by subtracting the 2H signal from the video signal.

As one aspect of this embodiment, the 1H signal is level adjusted by amplifying it with a gain of two. Alternatively, the video and 2H signals may be attenuated relative to the 1H signal by a factor of one-half.

As a feature of this embodiment, prior to determining the difference between the first and second signals, they are filtered to extract substantially only those frequencies corresponding to the chrominance frequency band of the video signal. Correlation thus is determined primarily by the chrominance information with little influence from the luminance component.

In accordance with another embodiment of this invention, the aforementioned first signal is produced by extracting from the video signal an error signal representing unequal chrominance components in two successive line intervals, this error signal then being delayed by one line interval, and the delayed and undelayed error signals being summed. The second signal is produced by obtaining the difference between the delayed and undelayed error signal.

As an aspect of this embodiment, the error signal representing unequal chrominance components is produced by delaying the video signal by one horizontal line interval and then summing the delayed and undelayed video signal to produce a sum signal which, in turn, is filtered so as to extract therefrom substantially only those frequencies within the chrominance component frequency band.

In one application of this invention, the correlation indicating signal is used to control the operation of a luminance/chrominance separator. The separator preferably includes a comb filter having separate luminance and chrominance outputs. The luminance output is supplied, as is, through a variable gain amplifier to a combining circuit and also is supplied to that combining circuit by means of a chrominance trap and another variable gain circuit. The luminance output additionally is supplied through a further variable gain circuit to be combined with the chrominance output of the comb filter, the resultant signal then being filtered to have substantially only the chrominance frequency components extracted therefrom. The gains of the aforementioned variable gain circuits are adjusted with the degree of detected correlation. When complete correlation is detected, the gains of two of these circuits are reduced to approximately zero. As the degree of correlation is reduced, that is, as the level of the correlation indication signal increases, the gains of these two variable gain circuits increase. In the absence of correlation, the comb filter is effectively inoperative, and supplies both luminance and chrominance components at each of its outputs. The trap circuit functions to eliminate, or at least reduce, the chrominance component, thus leaving the luminance component. The aforementioned chrominance extraction filter serves to eliminate, or at least reduce, the luminance component, thus leaving the chrominance component.

BRIEF DESCRIPTION OF THE DRAWINGS

The following detailed description, given by way of example, will best be understood in conjunction with the accompanying drawings in which.

DETAILED DESCRIPTION OF CERTAIN PREFERRED EMBODIMENTS

Figure 1:
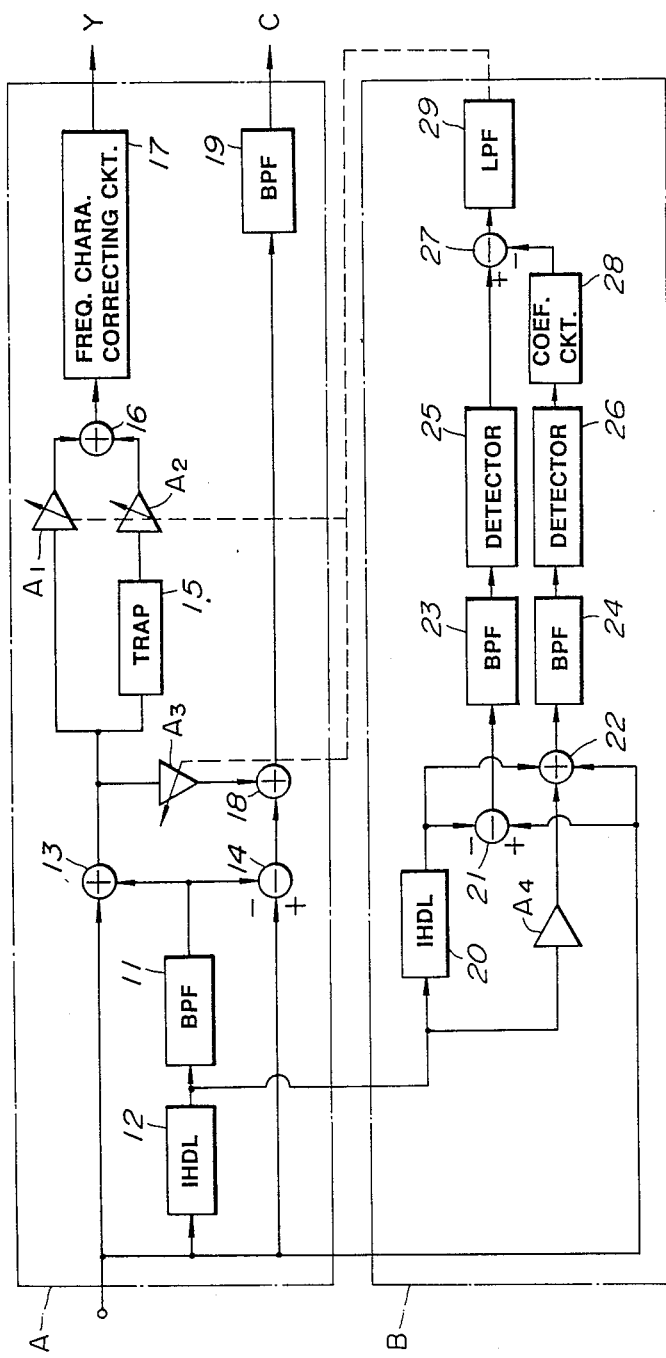
FIG. 1 is a block diagram of one embodiment of the present invention.

Referring now to the drawings, FIG. 1 is a block diagram of one embodiment of a correlation detector in accordance with the present invention. To best appreciate the advantages achieved by this invention, FIG. 1 also illustrates, in block diagram form, a luminance/chrominance (Y/C) separation circuit which is controlled by the correlation detector. More particularly, Y/C separation circuit A operates to process a video signal of the NTSC format and functions to separate the luminance and chrominance components from the composite video signal supplied to circuit A. Correlation detector B is adapted to indicate the correlation of vertically aligned pixels represented by the video signal.

Y/C separation circuit A includes a comb filter comprised of delay circuit 12, band pass filter 11, summing circuit 13 and subtracting circuit 14. Delay circuit 12 is adapted to impart a delay equal to one horizontal line interval of a typical video signal. This delay is referred to herein as a 1H delay.

Band pass filter 11 is coupled to the output of 1H delay circuit 12 and is adapted to have a pass band on the order of about ±500 KHz centered on the chrominance subcarrier frequency of 3.58 MHz. Thus, filter 11 is adapted to pass substantially only the chrominance components normally included in the composite video signal. The output of filter 11 is coupled to summing circuit 13 and to subtracting circuit 14, both of these circuits including additional inputs coupled to receive the input composite video signal.

Those of ordinary skill in the art will appreciate that, if the video signal exhibits high correlation, that is, if the information in one line is substantially identical to that in another, a luminance component is provided at the output of summing circuit 13 and a chrominance component is provided at the output of subtracting circuit 14. This occurs because the chrominance information, which is assumed to be substantially identical in two successive lines, nevertheless is out-of-phase and, thus, the chrominance information cancels in summing circuit 13. However, the luminance information is assumed to be in-phase and, thus, the luminance signal merely is reinforced. Conversely, the luminance information in two successive lines cancel each other in subtracting circuit 14, but the out-of-phase chrominance information now is reinforced. Thus, the luminance and chrominance components are effectively separated by the illustrated comb filter.

Summing circuit 13 is coupled by a trap circuit 15 and a controllable gain circuit A2 to a combining circuit 16, described herein as a summing circuit. Another controllable gain circuit A1 couples the output of summing circuit 13 directly to summing circuit 16. Preferably, controllable gain circuits A1 and A2 are amplifiers, but as will be described, these circuits may be controllable attenuators or other circuits normally used to adjust the level, or gain, of a signal supplied thereto.

Trap circuit 15 is adapted to remove those frequency components from the output of summing circuit 13 which are approximately equal to those frequency components included in the chrominance signal of a composite video signal. That is, trap circuit 15 serves to trap, or remove, such chrominance component frequencies.

The output of summing circuit 16 is coupled to a frequency characteristic correcting circuit 17 which serves to correct for distortion that may be caused by, for example, band pass filter 11. The output of correcting circuit 17 constitutes the luminance component.

The output of subtracting circuit 14 is coupled to a combining circuit 18, described herein as a summing circuit, to which the output of summing circuit 13 also is coupled by way of controllable gain circuit A3. Circuit A3 preferably is formed as an adjustable gain amplifier; but this controllable gain circuit may, alternatively, comprise an adjustable attenuator. The output of summing circuit 18 is coupled to a band pass filter 19 adapted to pass substantially only those frequency components which lie within the chrominance frequency range. Hence, the output of band pass filter 19 comprises the chrominance component.

Figure 2:
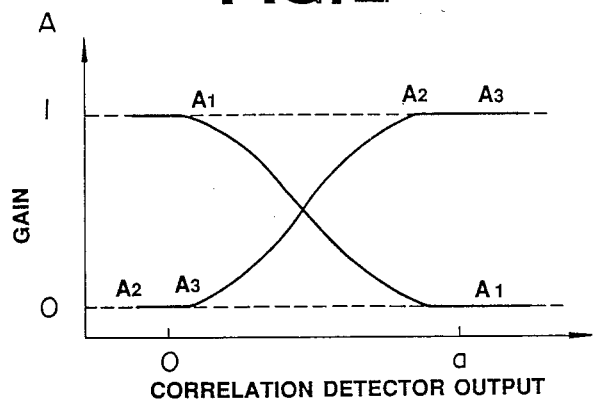
FIG. 2 is a graphical representation useful in understanding an application of this invention.

As shown, the gains of variable gain circuits A1, A2 and A3 are controlled by an output signal produced by correlation detector B. The gain of each of circuits A2 and A3 increases as the level of the output signal produced by the correlation detector increases. Concurrently, the gain of variable gain circuit A1 decreases as the output signal produced by the correlation detector increases. FIG. 2 is a graphical representation of the relationship between the output signal produced by the correlation detector and the gains of circuits A1, A2 and A3.

Correlation detector B, which produces a correlation indication signal for controlling the gain of variable gain circuits A1, A2 and A3, includes a difference circuit 21 for determining differences in the video signals of every other line, such as differences between signals in the nth and (n−2)th lines, and a summing circuit 22, which is adapted to sum the video signals of the nth, (n−1)th and (n−2)th lines. Difference circuit 21 is illustrated as having a positive input connected to receive the video signal supplied to the input terminal of Y/C separation circuit A and a negative input coupled to a delay circuit 20 which, in turn, is coupled to the output of delay circuit 12. Delay circuit 20 may be similar to aforedescribed delay circuit 12 and is adapted to impart a delay equal to one horizontal line interval. Hence, delay circuit 20 is referred to as a 1H delay circuit.

Summing circuit 22 includes respective inputs coupled to receive the video signal supplied to the input terminal of Y/C separation circuit A, the output of 1H delay circuit 20 and the output of 1H delay circuit 12, the latter being coupled to summing circuit 22 by means of a level setting circuit A4. The level setting circuit is adapted to set the level of the signal supplied by 1H delay circuit 12, that is, the signal in the (n−1)th line, relative to the level of the signals included in the nth and (n−2)th lines. Preferably, level setting circuit A4 is an amplifier having a gain of 2. The level setting circuit thus functions to double the level of the signal of the (n−1)th line relative to the signal levels of the nth and (n−2)th lines. Alternatively, no increase in the level of the signal of the (n−1)th line may be made but the signal level of the signals in the nth and (n−2)th lines may be attenuated by a factor of one-half.

Band pass filters 23 and 24 are coupled to the outputs of difference circuit 21 and summing circuit 22, respectively. These band pass filters are adapted to extract substantially only those frequencies which lie in the chrominance component frequency band.

Detectors 25 and 26 are coupled to band pass filters 23 and 24, respectively. In the preferred embodiment, the detectors comprise rectifier circuits and function to rectify those signals which lie in the chrominance frequency range, as filtered by band pass filters 23 and 24. The output of detector 25 is coupled directly to one input of a subtracting circuit 27, and the output of detector 26 is coupled via a coefficient circuit 28 to another input of the subtracting circuit. Coefficient circuit 28 is adapted to reduce the level of the rectified signal produced by detector 26 by a factor of one-half. Hence, it is appreciated that the coefficient circuit may comprise a simple attenuator, or the like.

In the illustrated embodiment, subtracting circuit circuit 27 functions to subtract the attenuated output provided by detector 26 from the output provided by detector 25. Thus, with respect to the chrominance frequency components, the output provided by summing circuit 22 is subtracted from the output provided by difference circuit 21. A low pass filter 29 is coupled to subtracting circuit 27 to pass the low frequency components included in the output provided by the subtracting circuit. The filtered signal functions as a correlation indication and is used as the gain controlling signal for level setting circuits A1, A2 and A3. In the preferred embodiment, the correlation indication signal provided by filter 29 sets the gains of gain controlled amplifiers A1, A2 and A3. It will be appreciated that low pass filter 29 serves to suppress any carrier component or ripple that may be superimposed on the difference signal produced by subtracting circuit 27.

The operation of correlation detector B now will be briefly described. The input video signal supplied to 1H delay circuit 12 included in Y/C separation circuit A imparts a delay of one line interval to the input video signal. The delayed signal is referred to herein as the 1H signal. This delayed 1H signal is supplied to delay circuit 20 which imparts yet another delay equal to one line interval. As a result, the output of delay circuit 20 exhibits a delay equal to two line intervals and, thus, is referred to herein as the 2H signal. Difference circuit 21 determines the difference between the input video signal and the 2H signal, this difference signal being filtered by band pass filter 23, rectified by detector 25 and supplied to subtracting circuit 27. It is appreciated that the signal thus supplied to the subtracting circuit represents the difference between the chrominance components included in the nth and (n−2)th line intervals.

Summing circuit 22 sums the input video signal, the 1H signal whose gain is doubled by level setting circuit A4 (which, preferably, comprises an amplifier) and the 2H signal. The output from summing circuit 22 is filtered, rectified, attenuated by coefficient circuit 28 and subtracted in subtracting circuit 27 from the signal provided by difference circuit 21. It will be recognized that, since the chrominance components included in the 1H signal are phase reversed with respect to the chrominance components included in the input video signal as well as those included in the 2H signal, the combination of summing circuit 22 and band pass filter 24 effectively operates to determine the difference between the chrominance components of the nth and (n−2)th lines on the one hand and the chrominance components of the (n−1)th line on the other. This difference is subtracted from the difference in the chrominance components included in the nth and (n−2)th lines, as provided by difference circuit 21. The resultant output provided by subtracting circuit 27 is an indication of the correlation of the video signal.

Figure 6:
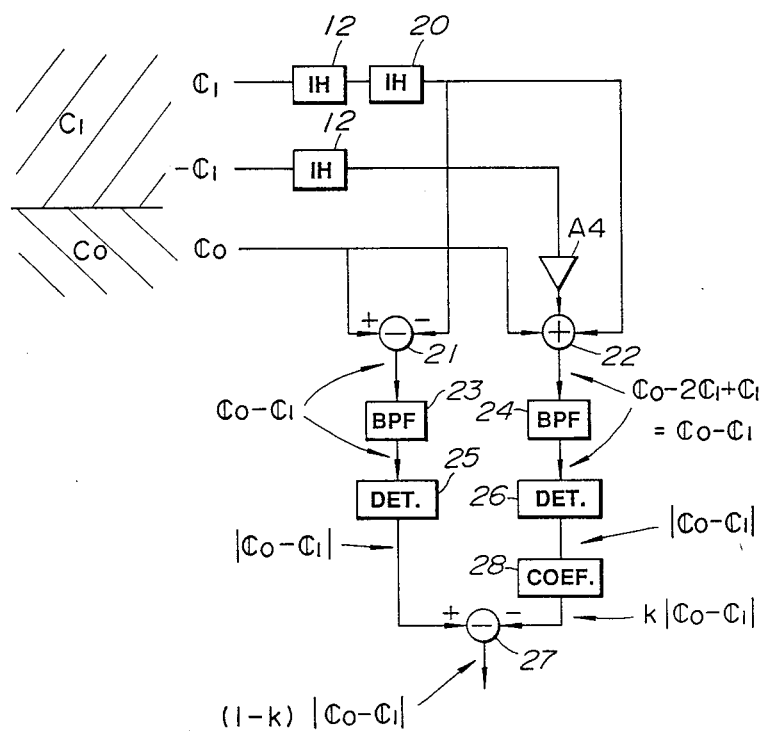
FIG. 6 is a block diagram useful in understanding the operation of the present invention.

To better understand the operation of correlation detector B, an example will be described with reference to the block diagram of FIG. 6. It is appreciated that FIG. 6 includes those elements which functionally constitute the correlation detector.

Let it be assumed that the chrominance component included in the line interval of the video signal presently being received (i.e. the nth line interval) is represented by the vector $C_0$. Let it be further assumed that the chrominance component of the preceding line interval, that is, the (n−1)th line, is represented by the vector $C_1$. It is appreciated that, in view of the phase change of the chrominance subcarrier from one line to the next, chrominance component $C_1$ of the (n−1)th line may be thought of as being negative with respect to chrominance component $C_0$. Finally, let it be assumed that the chrominance component of the next preceding line, that is, the chrominance component of the (n−2)th line is represented by the vector $C_1$. This vector relationship is illustrated graphically to the left of the block diagram of FIG. 6.

By reason of the aforementioned phase change of the chrominance subcarrier, at the time that the chrominance component $C_0$ of the nth line interval is received, the 1H delay signal produced by delay circuit 12 is equal to the vector $-C_1$, and the 2H signal produced by delay circuit 20 is equal to the vector $C_1$. Now, difference circuit 21 produces the difference signal $C_0 - C_1$; and filter 23 extracts the chrominance component frequencies from this difference signal. Detector 25 rectifies the difference signal $C_0 - C_1$ to produce the rectified difference signal $|C_0 - C_1|$.

Concurrently, summing circuit 22 sums the signals $C_0$, $-2C_1$ and $C_1$. It is appreciated that level setting circuit A4 functions to double the amplitude of the 1H signal relative to the amplitudes of the input video signal and the 2H signal. Thus, summing circuit 22 provides the sum signal $C_0 - 2C_1 + C_1 = C_0 - C_1$. Filter 24 extracts the frequency component frequencies from summing circuit 22 and detector 26 rectifies the extracted signal to produce the rectified signal $|C_0 - C_1|$.

Coefficient circuit 28 attenuates the rectified signal $|C_0 - C_1|$ by the factor k (in the example described above, $k = \frac{1}{2}$), and the attenuated signal $k|C_0 - C_1|$ is subtracted from the signal $|C_0 - C_1|$ by subtracting circuit 27. The subtracting circuit thus provides the difference $(1-k)|C_0 - C_1|$; and this signal is filtered by low pass filter 29. It is appreciated, therefore, that the correlation indication signal produced by correlation detector B is proportional to the difference in the chrominance components $C_0 - C_1$.

When the video signal exhibits accurate alignment, that is, when the pixel information in successive lines is substantially identical, $C_0 = C_1$ and the correlation indication signal is reduced to zero. As a result, the gain of amplifier A2 and the gain of amplifier A3 in Y/C separation circuit A are reduced to zero. Concurrently, the gain of amplifier A1 is equal to unity (or any other desirable factor). Thus, the luminance component produced at the output of summing circuit 13 of Y/C separation circuit A passes through amplifier A1 but is blocked by the zero gain of amplifier A2. Hence, only the separated luminance component is provided at the output of frequency characteristic correcting circuit 17.

At the same time, the zero gain of amplifier A3 serves to block the luminance component from being added to the chrominance component supplied by subtracting circuit 14 to summing circuit 18. Thus, substantially only the chrominance component appears at the output of summing circuit 18; and this chrominance component is filtered by filter 19 to appear at the output of Y/C separation circuit A. Of course, when successive lines of the video signal are aligned with substantially identical information, summing circuit 13 serves to eliminate the chrominance component and subtracting circuit 14 serves to eliminate the luminance component. Thus, the comb filter formed of band pass filter 11, delay circuit 12, summing circuit 13 and subtracting circuit 14 accurately separates the luminance and chrominance components.

Now, let it be assumed that there is virtually no vertical correlation in the input video signal. That is, the information contained in successive lines differs from line-to-line. Correlation thus may be thought of as being completely destroyed. As a result, the correlation indication signal produced by correlation detector B exhibits a high level, such as represented by output level a shown in FIG. 2. Accordingly, the gain of amplifier A1 is reduced to substantially zero, whereas the gain of each of amplifiers A2 and A3 is increased to unity (or some other maximum level as may be chosen).

Assuming little, if any, cancellation of the chrominance components in summing circuit 13 of Y/C separator A, the composite input video signal is supplied to trap circuit 15 which traps those signals whose frequencies fall within the range of the chrominance component. As a result, the signals at the chrominance subcarrier frequency $f_{sc}$ (3.58 MHz) are trapped; and pixel information of this frequency range is removed.

It is appreciated that the chrominance components supplied to subtracting circuit 14 from the input terminal and from the combination of filter 11 and delay circuit 12 may result in distortion or cancellation thereof. This effect of the comb filter on the chrominance component is compensated by summing the outputs of summing circuit 13 and subtracting circuit 14. This is achieved by summing circuit 18 which adds to the output of subtracting circuit 14 the composite video signal supplied by summing circuit 13 and amplified by amplifier A3. Thus, summing circuit 18 serves to restore the original composite video signal; and the chrominance component is extracted therefrom by band pass filter 19.

Hence, when correlation is completely destroyed, Y/C separation circuit A functions as a band pass filtering network to separate the luminance and chrominance components from the input video signal If the input video signal exhibits only partial correlation, that is, the information, and particularly chrominance information, in successive lines is not identical but, nevertheless, exhibits some similarities, the level of the correlation indication signal produced by correlation detector B lies between 0 and a. As a result, the gain of each of amplifiers A1, A2 and A3 is between 0 and unity, as represented by the curves of FIG. 2. Consequently, amplifier A1 supplies to summing circuit 16 a proportional amount of the output produced by summing circuit 13; and amplifier A2 supplies a portion of the signal provided by trap circuit 15. These proportional signal levels are combined by summing circuit 16; and after correction by frequency characteristic correcting circuit 17, results in the separated luminance component.

Likewise, amplifier A3 supplies to summing circuit 18 a proportional value of the output of summing circuit 13. Hence, summing circuit 18 functions to combine this proportional value with the output of subtracting circuit 14, thereby compensating or cancelling the effects of the comb filter on the chrominance component. After being filtered by band pass filter 19, the combined signals produced by summing circuit 18 appear as the separated chrominance component.

Thus, as the degree of correlation varies, the operation of Y/C separation circuit A also varies between that of a comb filter (as when correlation is substantially complete) to that of a band pass filter (as when correlation is completely destroyed). The combination of comb filtering and band pass filtering obtains when there is some degree (less than complete) of correlation.

Figure 5:
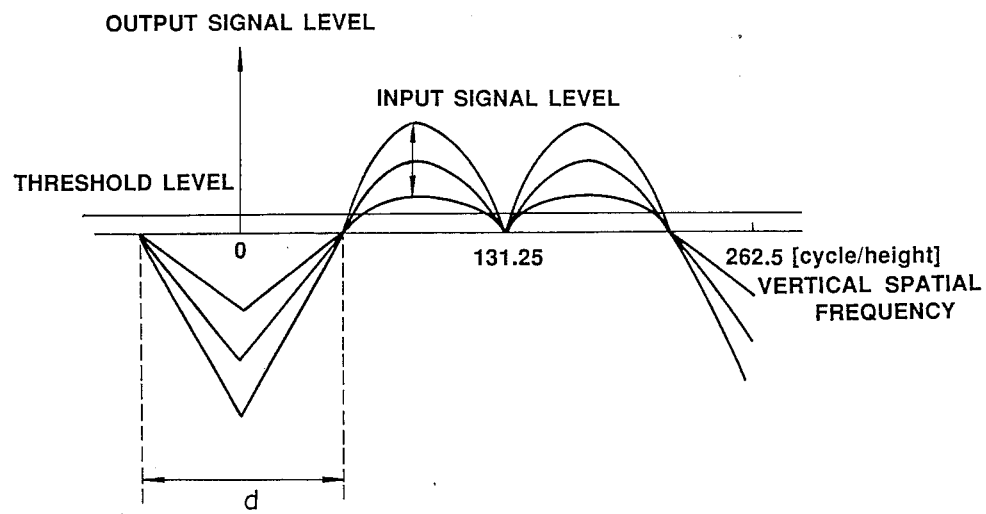
FIG. 5 is a graphical representation produced by combining the representations of FIGS. 3 and 4.

If the correlation indication signal produced by correlation detector B is compared to a relatively low threshold level, the existence of correlation will be indicated over a relatively wide range of the correlation indication signal, as represented by range d in FIG. 5. Hence, slight vertical offsets of the pixels can be tolerated. But, and advantageously, correlation detector B exhibits high sensitivity to detect unacceptable vertical correlation as represented by the correlation indication signal being out of range d.

Figure 3:
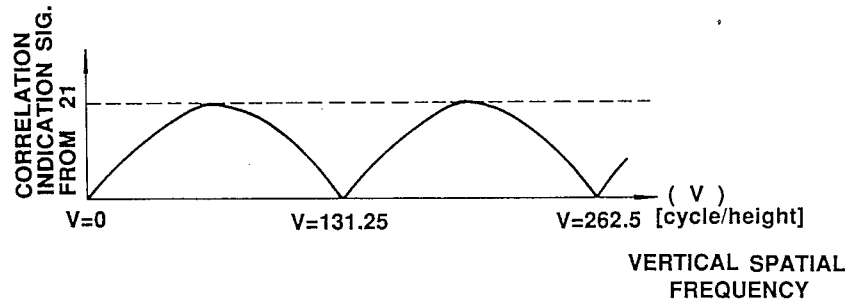
FIG. 3 is a graphical representation of the vertical spatial frequency characteristics of one of the signals produced by the circuitry of this invention.
Figure 4:
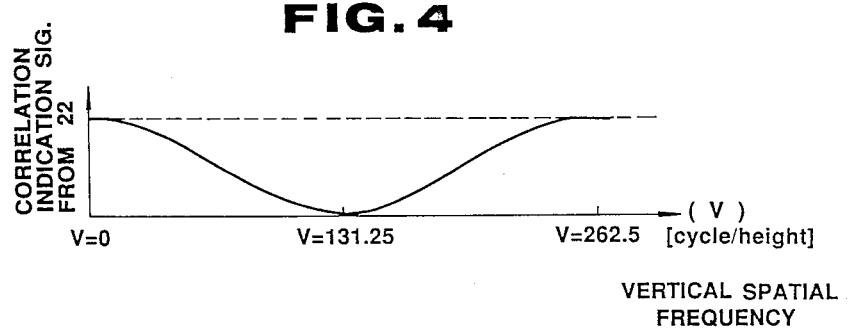
FIG. 4 is a graphical representation of the vertical spatial frequency characteristics of another signal produced by the circuitry of this invention.

As discussed above, detector 25 rectifies the chrominance components (i.e. those components having frequencies in the chrominance frequency band) of the difference signal produced by difference circuit 21. Likewise, detector 26 rectifies the chrominance components of the sum signal produced by summing circuit 22. FIG. 3 is a graphical representation of the vertical spatial frequency of a component assumed to be in the center of the chrominance frequency band, taken over a video field of, for example, 262.5 line intervals, and appearing at the output of difference circuit 21. FIG. 4 is a graphical representation of the vertical spatial frequency of that same component appearing at the output of summing circuit 22. The difference between these respective vertical spatial frequency characteristics is represented by FIG. 5, and is produced by subtracting circuit 27. It is recognized that subtracting circuit 27 thus functions to subtract the vertical spatial frequency characteristic shown in FIG. 4, and derived from the sum signal produced by summing circuit 22, from the vertical spatial frequency characteristic shown in FIG. 3, and derived from the difference signal produced by difference circuit 21.

If the input video signal is, for purposes of discussion, assumed to be of a frequency in the vicinity of 3.58 MHz, the level of the difference signal produced by difference circuit 21 is relatively low, provided that the phase shift of the video signal from line-to-line, and particularly between the nth and (n−2)th lines, is substantially less than 180°. Furthermore, again assuming that the input video signal is of a frequency approximately 3.58 MHz and represents substantially the same information from line-to-line, the sum signal produced by summing circuit 22 is slightly less than four times the level of the input video signal. With this assumption, a conventional correlation detecting technique would compare the correlation indication signal to a threshold level and would erroneously indicate that the video signal of the present example is not correlated. However, subtracting circuit 27 of correlation detector B of the present invention produces a negative correlation indication signal which correctly indicates the presence of vertical correlation.

Figure 7:
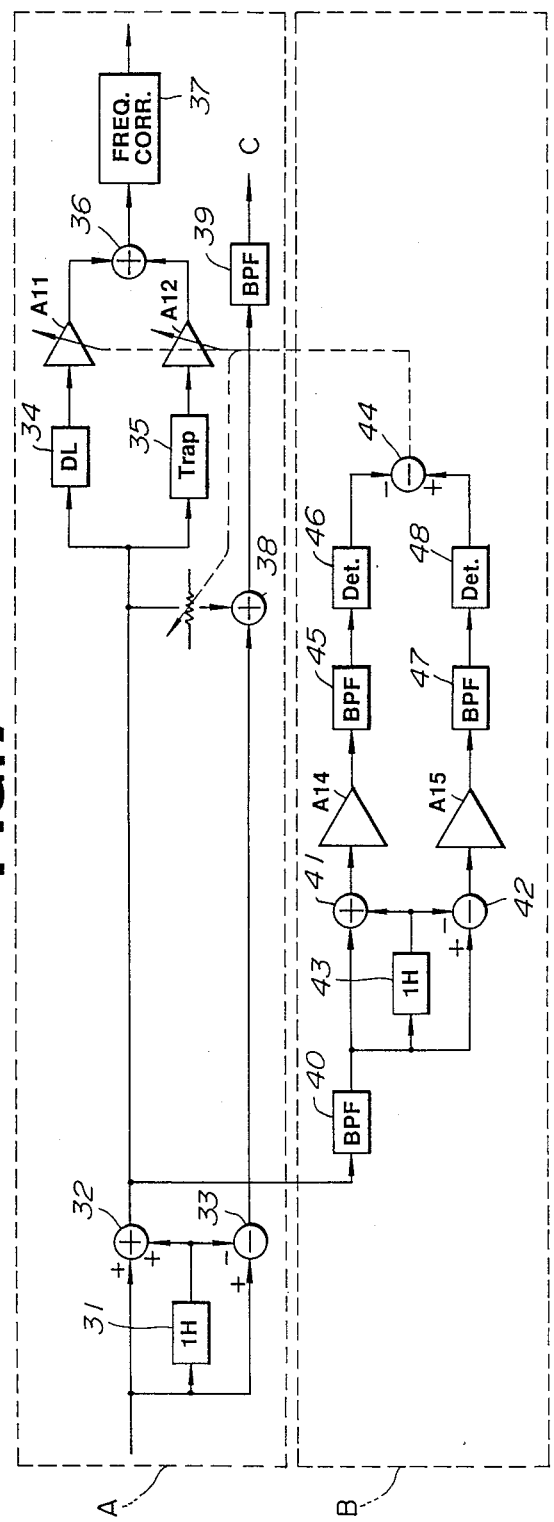
FIG. 7 is a block diagram of another embodiment of the present invention.

Another embodiment of the present invention is illustrated by the block diagram of FIG. 7. Y/C separation circuit A is substantially similar to that shown in FIG. 1 and includes a comb filter formed of delay circuit 31 which couples a delayed video signal, referred to above as the 1H signal, to summing circuit 32 and subtracting circuit 33 which also are supplied with the input video signal. Summing circuit 32 is coupled to combining circuit 36 by level setting circuit A11 and also by trap circuit 35, the output of which is coupled to the combining circuit by level setting circuit A12. As in the FIG. 1 embodiment, level setting circuits A11 and A12 preferably are amplifiers. A delay circuit 34 is included in series with amplifier A11 to compensate for delays which may be attributable to trap circuit 35. The output of combining circuit 36 is coupled to frequency characteristic correcting circuit 37 from which the luminance component is derived.

The outputs of summing circuit 32 and subtracting circuit 33 are combined in combining circuit 38; and a level setting circuit A13, which may be an amplifier similar to aforedescribed amplifier A3, or alternatively, an attenuator, couples the output of summing circuit 32 to combining circuit 38. The output of this combining circuit is filtered by band pass filter 39 from which the chrominance component is derived.

It will be recognized that Y/C separation circuit A of FIG. 7 operates in substantially the same way as has been described above and, in the interest of brevity, further description is not provided.

Correlation detector B shown in FIG. 7 differs from the correlation detector described in conjunction with FIG. 1 by reason of the circuitry used to produce the sum and difference signals described above. In particular, a band pass filter 40 is coupled to the output of summing circuit 32 included in Y/C separation circuit A. The band pass filter is adapted to extract the chrominance component appearing at the output of summing circuit 32. It will be appreciated that the band pass filter thus produces an error signal representing unequal chrominance components in two successive line intervals of the video signal. This error signal is supplied to summing circuit 41 and to difference circuit 42.

A delay circuit 43 having a time delay equal to one horizontal line interval is coupled to band pass filter 40 and serves to delay the aforementioned error signal by one line interval. This delayed error signal is supplied to summing circuit 41, whereat it is added to the undelayed error signal, and it also is supplied to difference circuit 42 where it is subtracted from the undelayed error signal. Summing circuit 41 produces a sum signal which, as will be described below, represents the summation of the chrominance components in three successive lines, that is, in the nth, $(n-1)$th and $(n-2)$th lines. Difference circuit 42 produces a difference signal which, as will be described below, represents the difference between the chrominance components in two of these three line intervals, namely the difference between the chrominance components of the nth and $(n-2)$th lines.

The output of summing circuit 41 is coupled to a subtracting circuit 44 by means of a band pass filter 45 and a detector 46, these elements being similar to aforedescribed band pass filter 24 and detector 26. Similarly, the output of difference circuit 42 is coupled to subtracting circuit 44 by band pass filter 47 and detector 48, these latter elements being similar to aforedescribed band pass filter 23 and detector 25. Amplifiers A14 and A15 are connected to the outputs of summing circuit 41 and difference circuit 42, respectively, and perform a function similar to that carried out by aforementioned coefficient circuit 28. The gains of amplifiers A14 and A15 are set to exhibit a ratio of, for example, 1:2. The gains of these amplifiers need not be limited solely to this ratio, and other ratios are contemplated such as 2:3. Thus, whereas coefficient circuit 28 attenuates the level of the sum signal by a factor of ½, amplifiers A14 and A15 achieve substantially the same function in that the level of the sum signal is attenuated relative to that of the difference signal by a factor of ½ (or, as another example, by a factor of ⅔).

Figure 8:
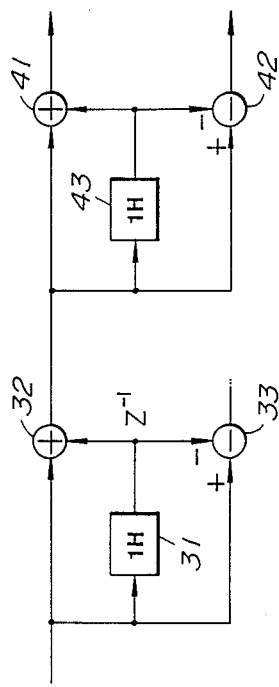
FIG. 8 is a block diagram which is useful in understanding the operation of the embodiment shown in FIG. 7.

FIG. 8 is a simplified representation of the correlation detector shown in FIG. 7; and it is assumed, for the purpose of discussing the simplification of FIG. 8, that only the chrominance components are present. This assumption is accurate in view of the use of band pass filters 40, 45 and 47 which effectively remove the luminance component from the signals. Similar to the example discussed above in conjunction with FIG. 6, let it be assumed that the chrominance signal of the presently received line interval, that is, the nth line interval, is represented by the vector $C_0$, the chrominance signal of the preceding line, that is, the $(n-1)$th line, is represented by the vector $C_1$, and the chrominance signal of the next preceding line, that is, the $(n-2)$th line is represented by the vector $C_1$. Of course, by reason of the phase reversal of the chrominance subcarrier, the chrominance signal of the $(n-1)$th line may be represented as $-C_1$.

Now, the chrominance signals supplied to summing circuit 32 are $C_0$ and $-C_1$. Hence, summing circuit 32 supplies to summing circuit 41 and to difference circuit 42 the error signal $C_0-C_1$.

During the preceding line interval, summing circuit 32 was supplied with the chrominance signals $C_1$ and $-C_1$. Thus, at the present time, delay circuit 43 supplies a signal of zero level to summing circuit 41 and to difference circuit 42. Hence, the sum signal produced by summing circuit 41 at the present time, that is, at the time the nth line interval is received, is equal to $C_0-C_1$. Likewise, the difference signal now produced by difference circuit 42 is $C_0-C_1$. It is seen that these are the same signals as were produced by summing circuit 22 and difference circuit 21 of the embodiment described above in conjunction with FIG. 1. Thus, the alternative embodiment of FIG. 7 produces substantially the same correlation indication signal as is produced by the embodiment of FIG. 1.

While the present invention has been particularly shown and described with reference to preferred embodiments, it will be readily appreciated that various changes and modifications may be made without departing from the spirit and scope of the invention. Some of these changes have been discussed above. For example, attenuators may be used in place of some or all of the amplifiers to carry out level setting operations. Rather than amplify the level of a particular signal, the levels of other signals may be attenuated. For example, rather than amplify the level of the 1H signal in FIG. 1, as by amplifier A4, the levels of the input video signal and the 2H signal may be attenuated.

It is intended that the intended claims be interpreted as including not only the embodiments specifically described above but also the aforementioned changes as well as other equivalents to the specific embodiments disclosed herein.

What is claimed is:

1. A correlation detecting method for use in a video processing system supplied with a video signal having a chrominance component, comprising the steps of:
   combining three successive lines intervals of the video signal to produce a first signal by obtaining the sum of said video signals of said three successive line intervals;
   combining at least two of said three successive line intervals of the video signal to produce a second signal by obtaining the difference between the video signals of said two line intervals;
   detecting absolute values of said first and second signals, respectively; and
   substracting one of the absolute values of said first and second signals from the other to produce a difference signal representing correlation.

2. The method of claim 1 wherein said step of producing the first signal comprises delaying the supplied video signal by one horizontal line interval to provide a one-line delayed (1H) signal; delaying the supplied video signal by two horizontal line intervals to provide a two-line delayed (2H) signal, level adjusting the 1H signal relative to the supplied video signal and the 2H signal; and summing the supplied video signal, the level adjusted 1H signal and the 2H signal to produce said first signal.

3. The method of claim 2 wherein the step of level adjusting the 1H signal comprises amplifying the 1H signal with a gain of two.

4. The method of claim 2 wherein said step of producing the second signal comprises subtracting the 2H signal from the supplied video signal.

5. The method of claim 1 wherein said step of producing the first signal comprises delaying the video signal by one horizontal line interval to provide a delayed video signal; summing the supplied and delayed video signal to produce a sum signal; delaying the sum signal by one horizontal line interval to provide a delayed sum signal; and summing the delayed sum signal and the sum signal to produce said first signal.

6. The method of claim 5 further comprising the step of filtering the sum signal to pass frequencies that are substantially only in a frequency range of the chrominance component.

7. The method of claim 6 wherein said step of producing the second signal comprises subtracting the delayed sum signal from the filtered sum signal.

8. Apparatus for detecting correlation in a video signal processing system, comprising:
input means for supplying a video signal having a chrominance component;
difference means for producing a difference signal representing the difference between two of three successive horizontal lines of said video signal;
summing means for producing a sum signal representing the sum of said three successive horizontal lines;
level setting means for setting the level of one of the three successive horizontal lines summed by said summing means relative to the other horizontal lines;
detector means for detecting absolute values of said difference signal and said sum signal, respectively; and
subtracting means for subtracting one of the absolute values of said sum and difference signals from the other to produce an output signal indicative of correlation.

9. The apparatus of claim 8 wherein said subtracting means subtracts said sum signal from said difference signal.

10. The apparatus of claim 8 further comprising filter means for filtering said sum and difference signals to pass to said subtracting means the chrominance components of said sum and difference signals.

11. The apparatus of claim 8 wherein said three successive horizontal lines comprise the nth, (n−1)th and (n−2)th horizontal lines, respectively; and said level setting means comprises amplifying means for providing relative amplification of the nth, (n−1)th and (n−2)th horizontal lines, such that the level of the (n−1)th horizontal line is twice that of the nth and (n−2)th lines, respectively.

12. The apparatus of claim 11, further comprising means for supplying said nth and (n−2)th horizontal lines to said difference means.

13. The apparatus of claim 8 further comprising first delay means for delaying the supplied video signal by one horizontal line interval to provide a one-line delayed (1H) signal and second delay means for delaying the supplied video signal by two horizontal line intervals to provide a two-line delayed (2H) signal; means for supplying the video signal and the 2H signal to said difference means; and means for supplying the video signal, the 1H signal and the 2H signal to said summing means.

14. A video signal correlation detector comprising:
input means for receiving a video signal having a chrominance component;
first delay means for delaying the received video signal by one horizontal line interval to provide a one-line delayed (1H) signal;
second delay means coupled to said first delay means for delaying the 1H signal by one horizontal line interval to provide a two-line delayed (2H) signal;
level setting means for amplifying the 1H signal;
difference means coupled to receive said video signal and said 2H signal for producing a difference signal representing the difference therebetween;
summing means for summing said video signal, the amplified 1H signal and said 2H signal to produce a sum signal;
detector means for detecting absolute values of said difference signal and said sum signal, respectively; and
subtracting means to produce a correlation indication signal as a function of the difference between the absolute values of said sum and difference signals.

15. The detector of claim 14 wherein said level setting means exhibits a gain such that said sum signal is substantially equal to zero when complete correlation is indicated.

16. The detector of claim 15 wherein said correlation indication signal is substantially equal to zero when complete correlation is indicated.

17. The detector of claim 15 wherein said gain is 2 relative to said video signal and said 2H signal.

18. The detector of claim 14 further comprising filter means coupled to said sum and difference means for extracting from said sum and difference signals frequencies that are substantially only in a frequency range of the chrominance component and for supplying the extracted frequencies to said subtracting means.

19. The detector of claim 18 further comprising rectifying means coupled to said filter means for rectifying the extracted frequencies supplied to said subtracting means.

20. A correlation detector for use in a video signal processing system of the type having a comb filter for separating luminance and chrominance components of a video signal, said detector comprising:
filter means coupled to said comb filter for receiving the luminance component therefrom and for extracting an error signal representing unequal chrominance components in two successive horizontal lines of the video signal;
delay means coupled to said filter means for delaying the error signal by one horizontal line interval;
difference means coupled to receive the error signal and the delayed error signal for producing a difference signal representing the difference therebetween;
summing means coupled to receive the error signal and the delayed error signal for producing a sum signal representing the summation thereof;

detector means for detecting absolute values of said difference signal and said sum signal, respectively; and subtracting means to produce a correlation indication signal as a function of the difference between the absolute values of the sum and difference signals.

21. The detector of claim 20 wherein said error signal is substantially equal to zero when complete correlation is present.

22. The detector of claim 20 further comprising level adjusting means coupled to said difference means and to said summing means for adjusting the levels of said difference and sum signals in accordance with a predetermined ratio.

23. The detector of claim 22 wherein the predetermined ratio of the difference signal to the sum signal is within the range 2:1 to 3:2.

24. Video signal separating apparatus comprising:
luminance/chrominance separating means for separating luminance and chrominance components from an input video signal;
chrominance trapping means coupled to said separating means for receiving the luminance component output and for trapping signal frequencies in the vicinity of an edge of a chrominance frequency band;
first combining means for combining the luminance component output separated by said separating means and the luminance component output provided by said chrominance trapping means;
first controllable amplitude adjusting means for adjusting the amplitude of the luminance component output provided by said chrominance trapping means;
second combining means for combining the chrominance component output separated by said separating means and a controlled amplitude luminance component output separated by said separating means;
second controllable amplitude adjusting means for adjusting the amplitude of the luminance component output supplied to said second combining means by said separating means;
third controllable amplitude adjusting means for adjusting the amplitude of the luminance component output supplied to said first combining means by said separating means; and
correlation detecting means for producing a correlation indication signal to control said first and second amplitude adjusting means, said correlation detecting means comprising:
first processing means for producing a first signal representing the sum of the video signals of three successive line intervals;
second processing means for producing a second signal representing the difference between the video signals of at least two of said three successive line intervals;
detector means for detecting absolute values of said first and second signals, respectively; and
subtracting means for subtracting the absolute values of one of the first and second signals from the other to produce said correlation indication signal.

25. The apparatus of claim 24 wherein said first and second controllable amplitude adjusting means each comprises an amplifier whose gain is controlled by said correlation indication signal, said gain being substantially zero when complete correlation is detected.

26. The apparatus of claim 25 wherein said third amplitude adjusting means has a gain inversely controlled by said correlation indication signal relative to the gains of said first-mentioned amplifiers.

27. The apparatus of claim 24 wherein said first processing means comprises:
first delay means for delaying the video signal by one horizontal line interval to provide a one-line delayed (1H) signal;
second delay means for delaying the video signal to provide a two line delayed (2H) signal;
level adjusting means for adjusting the level of the 1H signal relative to the video and 2H signals; and
summing means for summing the video, level-adjusted 1H and 2H signals to produce said first signal.

28. The apparatus of claim 27 wherein said second processing means comprises difference means for obtaining the difference between the video and 2H signals to produce said second signal.

29. The apparatus of claim 28 further comprising filter means for coupling the respective outputs from said summing means and said difference means to said subtracting means, the filter means passing substantially only those frequency components within a frequency band of the chrominance component.

30. The apparatus of claim 24 wherein said first processing means comprises:
filter means for receiving the luminance component output produced by said separating means, the filter means having a pass band to pass substantially only those frequency components within a frequency band of the chrominance component;
delay means coupled to said filter means for delaying the filtered luminance component output by one horizontal line interval; and
summing means for summing the filtered luminance component output and the delayed filtered luminance component output.

31. The apparatus of claim 30 wherein said second processing means comprises difference means for obtaining the difference between the filtered luminance component output and the delayed filtered luminance component output.

32. Apparatus for detecting correlation of a video signal having a chrominance component, comprising:
first processing means to produce a first signal representing the sum of the video signals of three successive line intervals;
second processing means to produce a second signal representing the difference between the video signals of two of the three successive line intervals;
detector means for detecting absolute values of said first and second signals, respectively; and
subtracting means for subtracting the absolute values of one of the first and second signals from the other to produce a correlation indication signal.

33. The apparatus of claim 32 wherein said first processing means comprises:
first delay means for delaying the video signal by one horizontal line interval to provide a one-line delayed (1H) signal;
second delay means for delaying the video signal to provide a two line delayed (2H) signal;
level adjusting means for adjusting the level of the 1H signal relative to the video and 2H signals; and summing means for summing the video, level-adjusted 1H and 2H signals to produce said first signal.

34. The apparatus of claim 33 wherein said second processing means comprises difference means for obtaining the difference between the video and 2H signals to produce said second signal.

35. The apparatus of claim 34 further comprising filter means for coupling the outputs from said summing means and said difference means to said subtracting means, the filter means passing substantially only those frequency components within a frequency band of the chrominance component.

36. The apparatus of claim 32 wherein said first processing means comprises:
first delay means for delaying the video signal by one horizontal line interval to provide a delayed video signal;
first summing means for summing the video signal and the delayed video signal to produce a sum signal;
second delay means for delaying the sum signal by one horizontal line interval to provide a delayed sum signal; and
second summing means for summing the delayed sum signal and the sum signal to produce said first signal.

37. The apparatus of claim 36 wherein said second processing means comprises subtracting means for subtracting the delayed sum signal from the sum signal to produce said second signal.

38. The apparatus of claim 37 further comprising band pass filter means coupled to the output of said first delay means and having a pass band to pass substantially only those frequency components within a frequency band of the chrominance component, whereby said sum signal is a filtered sum signal containing chrominance frequency components.

* * * * *